(12) United States Patent
Xun et al.

(10) Patent No.: US 9,081,654 B2
(45) Date of Patent: Jul. 14, 2015

(54) COMMON LEASE AGENT FOR CLUSTER COMMUNICATION

(71) Applicant: Microsoft Corporation, Redmond, WA (US)

(72) Inventors: Lu Xun, Redmond, WA (US); Mihail Gavril Tarta, Sammamish, WA (US); Yang Li, Redmond, WA (US); Gopala Krishna R. Kakivaya, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 13/745,216

(22) Filed: Jan. 18, 2013

(65) Prior Publication Data

US 2014/0208173 A1    Jul. 24, 2014

(51) Int. Cl.
  *G06F 11/30* (2006.01)
  *G06F 11/00* (2006.01)

(52) U.S. Cl.
  CPC .................................... *G06F 11/006* (2013.01)

(58) Field of Classification Search
  CPC .. G06F 11/006; G06F 11/008; G06F 11/0709
  USPC ..................................................... 714/48, 11
  See application file for complete search history.

(56) References Cited

U.S. PATENT DOCUMENTS

| | | | |
|---|---|---|---|
| 6,728,737 B2 | 4/2004 | Wollrath et al. | |
| 6,760,736 B2 | 7/2004 | Waldo et al. | |
| 6,775,703 B1 | 8/2004 | Burns et al. | |
| 6,950,874 B2 | 9/2005 | Chang et al. | |
| 7,260,543 B1 | 8/2007 | Saulpaugh et al. | |
| 8,347,300 B2 | 1/2013 | McLean et al. | |
| 2001/0000812 A1* | 5/2001 | Waldo et al. | 709/225 |
| 2003/0220943 A1* | 11/2003 | Curran et al. | 707/202 |
| 2005/0229180 A1* | 10/2005 | Ricciardi | 718/100 |
| 2009/0052329 A1* | 2/2009 | Mahajan et al. | 370/242 |
| 2010/0106831 A1* | 4/2010 | Kakivaya et al. | 709/225 |
| 2010/0107002 A1 | 4/2010 | Kakivaya et al. | |
| 2011/0225120 A1 | 9/2011 | Cooper et al. | |
| 2013/0039166 A1* | 2/2013 | Brown et al. | 370/216 |
| 2013/0066931 A1* | 3/2013 | Lacapra et al. | 707/827 |
| 2013/0166707 A1* | 6/2013 | Christenson et al. | 709/221 |
| 2013/0332921 A1* | 12/2013 | Khutornenko et al. | 718/1 |
| 2014/0095930 A1* | 4/2014 | Xun et al. | 714/25 |

\* cited by examiner

*Primary Examiner* — Chae Ko

(74) *Attorney, Agent, or Firm* — Sunah Lee; Harri Valio; Micky Minhas

(57) ABSTRACT

Detecting failures of interconnected machines. A method includes establishing a machine to machine lease at a first machine using a first lease agent at the first machine to a second lease agent at a second machine as a result of an application on the first machine requesting to establish a lease with an application on the second machine. Using the machine to machine lease, the method further includes detecting a communication failure between the first machine and the second machine or a machine failure of the second machine.

20 Claims, 3 Drawing Sheets

COMMON LEASE AGENT FOR CLUSTER COMMUNICATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

When different computing systems communicate with each other, it often involves different applications on the different computing systems communicating with each other. It may be useful for a given application to know if a computing system or application that it is communicating with has gone down.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of detecting failures of interconnected machines. The method includes establishing a machine to machine lease at a first machine using a first lease agent at the first machine to a second lease agent at a second machine as a result of an application on the first machine requesting to establish a lease with an application on the second machine. Using the machine to machine lease, the method further includes detecting a communication failure between the first machine and the second machine or a machine failure of the second machine.

Another embodiment includes a method of detecting failures of interconnected machines. The method includes establishing a machine to machine lease at a first machine using a first lease agent at the first machine as the result of a first application instance on the first machine requesting to establish a lease with a second application instance. Using the lease, the method further includes detecting an application failure of the second application instance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In some embodiments described herein, a lease layer/agent can be used for failure detection in a partially synchronous system. This can be an important building block for building various complex distributed applications. In particular, a generic lease model can be shared by various applications at the same time without incurring extra bandwidth. Embodiments may provide failure detection at both machine level and application instance level. Having a separate lease agent may allow for embodiments to have a very efficient implementation as the performance of lease agent plays an important role in the amount of time for failure detection to occur.

Figure 1:
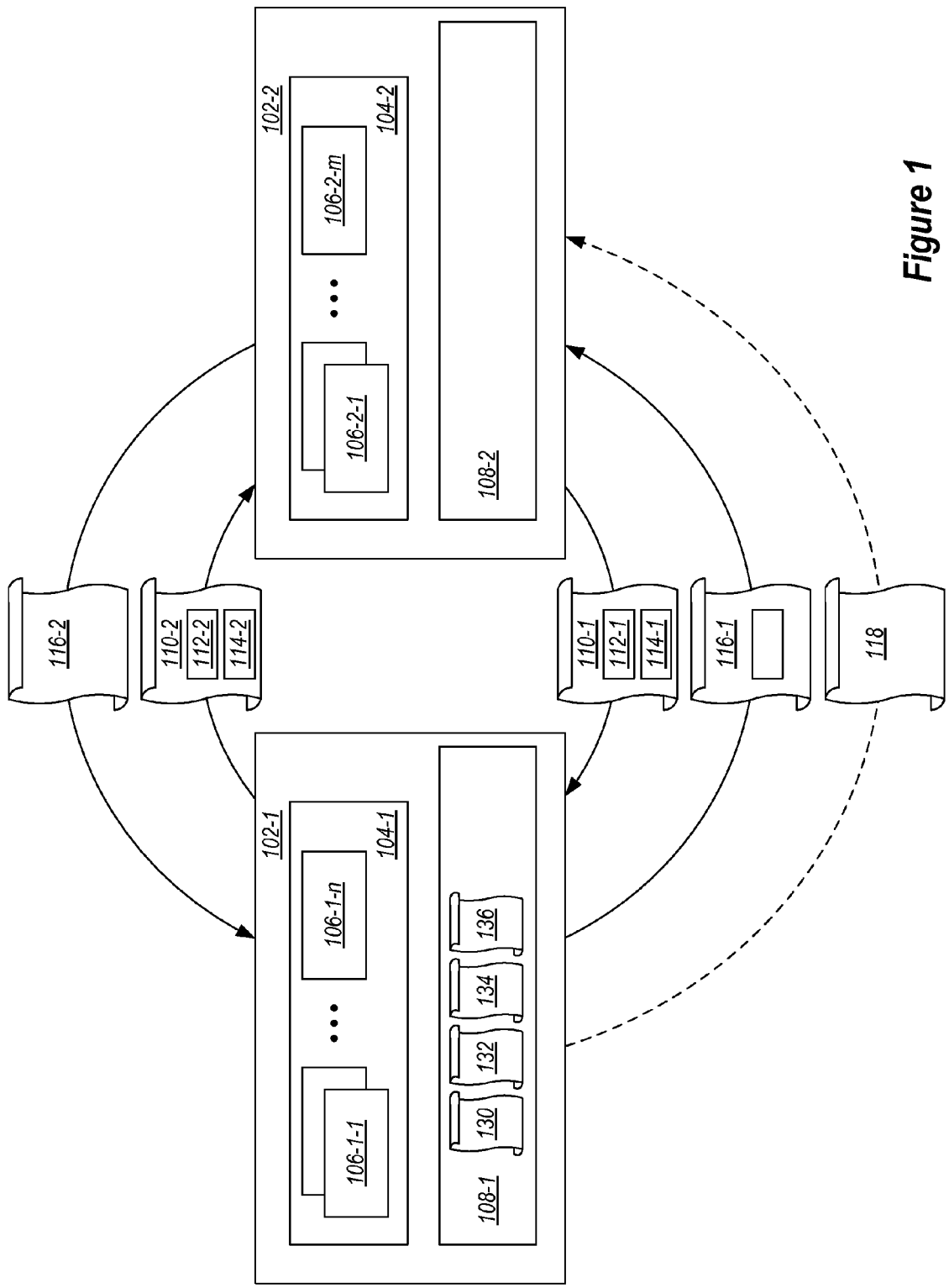
FIG. 1 illustrates application layers and lease agents on different machines.

Referring now to FIG. 1, an example is illustrated. FIG. 1 illustrates two machines 102-1 and 102-2 (which may be referred to herein generically as 102). The two machines each include an application layer 104-1 and 104-2 respectively (which may be referred to herein generically as 104). The application layers 104 include one or more application instances illustrated as 106-1-1 through 106-1-n and 106-2-1 through 106-2-m (which may be referred to herein generically overall as 106, as 106-1 generically for the applications on machine 102-1 and as 106-2 generically for the applications on machine 102-2). Each of the machines 102 also include a lease agent 108-1 and 108-2 (which may be referred to herein generically as 108). The lease agents can provide signaling between the machines to indicate that the machines are still functioning and what applications on the machines are still functioning. For example, this may be done through a "heartbeat" message or other limited messaging scheme. Further, applications 106 may request and renew leases with the lease agent so that the lease agent 108 has information on what applications 106 are running on a machine 102.

The basic usage of the lease agents 108 is for an application instance (e.g. application instance 106-1-1) running on one machine (e.g. machine 102-1) to detect when an application instance (e.g. application instance 106-2-1) running on another machine (e.g. machine 102-2) has stopped functioning. This can occur for a number of different reasons, such as (1), an entire machine is down; (2) both machines (e.g. machines 102-1 and 102-2) are up but there is some communication problem between the two machines; or (3) the machines are both up but an application instance 106 on one of the machines is not functioning.

For the first two scenarios, the lease agent 108 is able to detect the failure. Note that the nature of the failure is very different between the two but they are indistinguishable from the perspective of the lease agent 108. However, as explained in more detail below, an arbitration mechanism can handle this ambiguity with consistency guarantees.

For the third case, the lease agent 108 will be able to detect the failure if the application instance 106 is not running or it is running but cannot renew its lease with the lease agent 108. However, it is theoretically possible that an application instance 106 is not functioning but appears to be working to the lease agent 108. In some embodiments it is the application's responsibility to make sure that this does not happen. Alternatively, this can be detected by some other means. For example, in some embodiments a local watchdog may be implemented that kills unresponsive/misbehaving applications.

Also note that when a machine 102 is up and communication is operative, the application instance 106 often has its own way to detect the failure. For example, it can send a message to the target application instance 106 (e.g. application instance 106-1-1 may be an originating application and application instance 106-2-1 may be a target application) and get a connection rejection (or a message indicating the failure, if the application can still respond to messages). However, such detection may not come in a timely manner if the application instance 106 does not have its own periodic traffic.

From the above scenarios, the lease agent 108 can be used as a mechanism to detect machine level failure. This may include detecting communication failures as communication problems are typically between machines, rather than between applications 106, assuming both the application layer 104 and the lease agent 108 are using the same physical transport mechanism. More accurately, leases are between machines, not between applications 106. This can be particularly desirable when multiple applications 106 use the same lease agent 108 on the same machine 102 so that multiple leases do not need to be shared between different applications 106.

Although the leases are between machines, the lease agent 108 nonetheless maintains the concept of an application. In particular, after a failure is detected, the lease agent 108 notifies the appropriate application instance 106 that is interested in this failure. However, different applications 106 can be interested in the failures of different machines 102 and therefore the lease agent 108 maintains such information in order for it to deliver the notification to the interested application instance 106. Further, for the third failure case described above, it is desirable not to rely on the application's own failure detection. When sending out a lease messages, a list of applications 106 running on the machines 102 can be provided so that the receiving machine (e.g. machine 102-2) can tell whether an application (e.g. application 102-1-1) running on the sending machine (e.g. machine 102-1) is still alive or not.

To be more precise, differentiation between applications and application instances is made. An application is a collection of relevant application instances running on different machines. It is also possible that multiple application instances belonging to the same application can be running on the same machine. The grouping of application instances is not necessary for simple lease between a pair of application instances, but can be useful for more complex one-to-many lease such as global lease.

Every application instance has an identifier that is used by the entire application and the lease agent 108. For simple leases, the lease agent 108 may only requires such identifier to be unique to each other, but, in some embodiments, it is useful to define the identifier to have an application name and another identifier that is unique within each application, to allow for future extension.

The following now illustrates details regarding a machine lease. Notably, machine leases may be established in either a one-way or two-way fashion. In one way monitoring, one machine monitors another machine without the first machine monitoring the second machine. In two-way monitoring, both machines monitor each other.

One-Way Monitoring

In the depicted embodiment, monitor machine 102-1 is to monitor subject machine 102-2. However, any machine may monitor any other machine.

Embodiments of the invention include one machine monitoring another machine. One machine monitoring another machine can include an act of a subject machine generating a subject side time-to-live duration value for use in monitoring of the subject machine. For example, subject machine 102-2 can establish a time-to-live (TTL) duration value. The TTL duration value indicates a duration for which subject machine 102-2 can assume a monitoring relationship with monitor machine 102-1 is active.

One machine monitoring another machine can include an act of the lease agent 108-2 of a subject machine 102-2 sending an establish request 110-1-1 to the lease agent 108-1 of the monitor machine 102-1. The establish request 110-1 is indicative of the subject machine 102-2 requesting that the monitor machine 102-1 monitor the subject machine 102-2. The establish request 110-1 includes a subject side time-to-live duration value 112-1. The establish request 110-1 further includes application information 114-1.

The application information 114-1 includes the states of the applications in the application layer 104-2. This can indicate what application instances 106 are running on the subject machine 102-2.

One machine monitoring another machine can include an act of the subject machine establishing an existing subject side time-to-die time based on the subject side time-to-live duration value 112-1 and the time the establish request 110-1 was sent. The subject machine clock reaching the existing subject side time-to-die time, prior to receiving an establish grant 116-1 from the monitor machine, is an indication of the subject machine 102-2 having to transition to a failure state. In other embodiments, other activities occur to transition subject machine 102-2 into a failure state.

One machine monitoring another machine can include an act of the monitor machine 102-1 deriving a monitor side time-to-live duration value from the subject side time-to-live duration value 112-1. In some embodiments, monitor machine 102-1 copies TTL duration value 112-1 to derive the monitor machine 102-1 TTL duration value. In these embodiments, TTL value duration 112-1 and the TTL value duration for the monitor machine 102-1 are equal. In other embodiments, monitor machine 102-1 modifies TTL duration value 112-1 to derive the monitor machine 102 TTL duration value. In these other embodiments TTL duration value 112-1 and the monitor machine 102 TTL duration value differ. For example, monitor machine 102-1 can increase the value of TTL duration value 112-1 to derive the monitor machine 102 TTL duration value such that the monitor machine 102-1 TTL duration value is larger than TTL duration value 112-1.

One machine monitoring another machine can include an act of the monitor machine 102-1 establishing a monitor side time-to-die time based on the monitor side time-to-live duration value and the time the establish request 110-1 was received. The monitor machine clock reaching the monitor side time-to-die time, prior to receiving a renew request from the subject machine, is indicative of a suspected failure of the subject machine. For example, monitor machine 102-1 monitor side time-to-die time is based on the monitor machine 102-1 TTL duration value and the time establish request 110-1 was received. The monitor side time-to-die time can be a time relative to monitor machine 102-1. If a clock of monitor machine 102-1 reaches the monitor side time-to-die time, prior to receiving a renew request from subject machine 102-2, monitor machine 102-1 suspects subject machine 102-2 of failure.

One machine monitoring another machine can include an act of the monitor machine 102-1 sending an establish grant 116-1 to the subject machine 102-2 to indicate to the subject machine 102-2 that the monitor machine 102-1 has agreed to monitor the subject machine 102-2. In some embodiments, the establish grant 116-1 can include the monitor side TTL duration value.

Alternately, a monitor machine 102-1 can send an establish reject to a subject machine 102-2 to indicate to the subject machine that the monitor machine has not agreed to monitor the subject machine 102-2. For example, in response to receiving establish request 110-1, monitor machine 102-1 can alternately (as shown by the dashed line) send establish reject 118 to subject machine 102-2. An establish reject generally indicates to subject machine 102-2 that monitor machine 102-1 has not agreed to monitor subject machine 102-2.

From time to time (and intermingled between the performance of other operations), a subject machine 102-2 can renew an established monitoring agreement with a monitor machine 102-1. Generally, the subject machine 102-2 leaves the existing agreement in force (the current subject-side-time to die time) until a new grant is received. However, the subject machine 102-2 can generate a new TTL duration value and derive what an updated time-to-die time would be. The subject machine 102-2 then sends the new TTL duration value to the monitor machine 102-1. The monitor machine 102-1 receives the new TTL duration value. When appropriate the monitor machine 102-1 grants the renew request and sends a renew grant back to the subject machine 102-2. The subject machine 102-2 receives the renew grant. In response to receiving the renew grant the subject machine 102-2 implements the renewed agreement using the updated time-to-die time as the new current time-to-die time.

Thus, in some embodiments, a renew request does not include a subject side TTL duration value. In these embodiments, continued use of TTL duration value 112-1 can be inferred. In other embodiments, TTL duration value 112-1 is expressly included in the renew request. In yet other embodiments, a different subject side TTL duration value is included in the renew request. A new subject side TTL duration value can be generated and used by subject machine 102-2 in response to configuration changes of subject machine 102-2 and/or to configuration changes elsewhere in a network.

Machine 102-2 can also calculate what an updated subject side time-to-die time is to be if a corresponding renew grant responsive to the renew request that is received. The calculation can be based at least on the time renew request was sent and on the subject side TTL duration value related to or associated with the renew request.

The monitor machine 102-1 can establish an updated monitor side time-to-die time in response to and based on the time renew request that was received and the implied or indicated monitor TTL duration value related to or potentially contained in a renew request. The updated monitor side time-to-die time can be a time relative to monitor machine 102-1. The updated monitor side time-to-die time can be subsequent to the monitor side time-to-die time. However, there is no requirement that the monitor side time-to-die time has occurred before establishing updated monitor side time-to-die time. Thus, it is also possible that the updated monitor side time-to-die time is in fact prior to (or the same as) the monitor side time-to-die time. If a clock of monitor machine 102-1 reaches the updated monitor side time-to-die time prior to receiving another renew request from subject machine 102-2, monitor machine 102-1 suspects subject machine 102-2 of failure.

If no subject side TTL duration value is included in the renew request (and thus the TTL duration value 112-1 is inferred) or if a renew request expressly includes TTL duration value 112-1, monitor machine 102-1 can also use the monitor machine 102 TTL duration value to establish the updated monitor side time-to-die time. On the other hand, if a subject side TTL duration value other than TTL duration value 112-1 is expressly included in the renew request, monitor machine 102-1 can use the other expressly included subject side TTL duration value to derive a new monitor side TTL duration value. From the new monitor side TTL duration value, monitor machine 102-1 can then establish the updated monitor side time-to-die time.

Monitor machine 102-1 can send a renew grant to the subject machine 102-2. One machine monitoring another machine can include an act of the subject machine receiving a renew grant from the monitor machine subsequent to sending the corresponding renew request and prior to the subject machine clock reaching the subject side time-to-die time. The subject machine 102-2 can receive a renew grant from monitor machine 102-1 subsequent to sending a renew request and prior to a clock at subject machine 102-2 reaching the subject side time-to-die time. Generally, the renew grant is indicative of monitor machine 102-1 agreeing to continue to monitor subject machine 102-2.

Alternately, in response to receiving a renew request, monitor machine 102-1 can alternately send a renew reject to subject machine 102-2. Subject machine 102-2 can receive a renew reject from monitor node 102-1. The renew reject generally indicates to subject machine 102-2 that monitor machine 102-1 is no longer agreeing to monitor subject machine 102-2.

Subject machine 102-2 can transition to an updated subject side time-to-die time when the corresponding renew grant message is received. The updated subject side time-to-die time can have been calculated based on the time the corresponding renew request was sent and on the TTL duration related to or associated with the renew request. The updated subject side time-to-die time can be a time (e.g., subsequent, prior, or equal to original subject side time-to-die time) relative to subject machine 102-2.

If TTL value 112-1 is still the appropriate TTL value, subject machine 102-2 can also use TTL duration value 112-1 to establish the updated subject side time-to-die time. If another TTL duration value has been generated, subject machine 102-2 can also use the other generated TTL duration value to establish the updated subject side time-to-die time.

Subsequent, to establishment of a current subject side time-to-die time, it may be that a clock at subject machine 102-2 reaches the current subject side time-to-die time prior to receiving another renew grant from monitor machine 102-1. This may result from communication errors between subject machine 102-2 and monitor machine 102-1. For example, subject machine 102-2 may send another renew request subsequent receiving the renew grant and prior to a clock of subject machine 102-2 reaching the updated subject side time-to-die time. However, due to communication failures, the other renew request does not reach monitor machine 102-1. Alternately, the other renew request may be received at monitor machine 102-1, but the corresponding renew grant from monitor machine 102-1 does not reach subject machine 102-2 due to communication errors. In either event, a clock at subject machine 102-2 may reach a current subject side time-to-die time prior to receiving the corresponding renew grant responsive to the other renew request.

Alternately, subject machine 102-2 can malfunction such that subject machine 102-2 is prevented from sending another renew request to monitor machine 102-1 prior to a clock at subject machine 102-2 reaching the updated subject side time-to-die time.

However, whether or not a renew request is sent, if a renew grant is not received prior to a clock at subject machine 102-2 reaching a current subject side time-to-die time, subject machine 102-2 transitions into a failure state.

Referring back to monitor machine 102-1, it may be that a clock at monitor machine 102-1 reaches a monitor side time-to-die time prior to receiving another renew request from subject machine 102-2 (either due to a malfunction at subject machine 102-2 or to communication errors). As a result, monitor machine 102-1 suspects subject machine 102-2 of failure. Monitoring machine 102-1 can transition to a timeout state indicative of detecting a suspected failure at another machine.

Two-Way Machine Monitoring

In other embodiments a pair of machines can monitor each other. Thus, a first machine can monitor a second machine 102-1nd the second machine can also monitor the first machine. For example, each machine can implement both the subject machine side and the monitor machine side of nod monitoring with the other machine.

Machine 102-1 can generate TTL duration value 112-2 for use in monitoring machine 102-1. Machine 102-1 can send establish request 110-2, including TTL duration value 112-2, to machine 102-2. Machine 102-1 can also establish a subject side time-to-die time based on TTL duration value 112-2. Machine 102-2 can receive establish request 110-2, including TTL duration value 112-2, from machine 102-1. Machine 102-2 can derive a TLL duration value from TTL duration value 112-2. Machine 102-2 can establish a monitor side time-to-die time based on the TTL duration value. The establish request 110-2 may further include application information 114-2. The application information 114-2 includes the states of the applications in the application layer 104-2. This can indicate what application instances 106 are running on the subject machine 102-2.

Machine 102-2 can send an establish grant 116-2 to machine 102-1. Machine 102-1 can receive establish grant 116-2 from machine 102-2.

In parallel, machine 102-2 can generate TTL duration value 112-1 for use in monitoring machine 102-2. Machine 102-2 can send establish request 110-1, including TTL duration value 112-1 and application information 114-1 to machine 102-1. Machine 102-2 can also establish a subject side time-to-die time based on TTL duration value 112-1. Machine 102-1 can receive establish request 110-1, including TTL duration value 112-1, from machine 102-2. Machine 102-1 can derive a TLL duration value from the TTL duration value. Machine 102-1 can establish monitor side time-to-die time based on the TTL duration value. Machine 102-1 can send grant message 116-1 to machine 102-2. Machine 102-2 can receive grant message 116-1 from machine 102-1.

Alternately, either of machines 102-1 and 102-2 reject an establish request from the other machine. For example, machine 102-1 can reject establish request 110-2. Likewise, machine 102-2 can reject establish request 110-1. When either machine rejects an establish request, it can send an establish reject. This indicates to the other machine that no monitoring agreement has been established.

Machine 102-1 and machine 102-2 can then exchange renew requests and renew grants (as well as renew rejects) as previously described. Accordingly, each of machine 102-1 and machine 102-2 are both a subject machine 102-1 and a monitor machine. Based on the depicted TTL duration values and time-to-die times in If a clock at machine 102-1 reaches the subject side time-to-die time prior to receiving a renew grant from machine 102-2, machine 102-1 transitions to a failure state. If a clock at machine 102-2 reaches the monitor side time-to-die time prior to receiving a renew request from machine 102-1, machine 102-2 suspects machine 102-1 of failure.

If a clock at machine 102-2 reaches the subject side time-to-die time prior to receiving a renew grant from machine 102-1, machine 102-2 transitions to a failure state. If a clock at machine 102-1 reaches the monitor side time-to-die time prior to receiving a renew request from machine 102-2, machine 102-1 suspects machine 102-2 of failure.

While in the examples above, the subject side takes complete control of monitoring, embodiments may be implemented where the reverse is true and the monitor establishes lease control.

Embodiments may be implemented where the lease agent 108 will determine the other side's status entirely upon lease. There are several reasons for this. First, it is expected that the lease agent 108 to be running most of the time. As it is light weight, even after the application instances 106 are shutdown, embodiments can still keep the lease service running (either constantly running or shutting down after a predetermined period of no activity). There is much less chance of the lease service going down as it can be encapsulated from the application logic. Second, connection rejection, whereby a machine rejects another machine may be less safe when a machine is under extreme load. Third, this can simplifies the local lease design because otherwise the local lease will have to use a shorter interval to actually benefit from this feature.

Each lease agent 108 has an instance identifier. Both the lease agent's listening address instance identifier is provided to the application layer 104 so that application instances 106, for example running on machine 102-2 can instruct its lease agent 108-2 to connect to the lease agent 108-1 on the machine 102-1.

The following illustrates what happens when a lease is expired. In this example, only a one-way lease is considered. For a two-way lease, embodiments can use the arbitration mechanism described below and after arbitration is completed it essentially becomes a one-way lease.

First consider the machine 102-1 that detects the failure of machine 102-2. This part is straightforward: the lease agent 108 just needs to inform the applications that are interested in the state of machine 102-2.

Now consider what happens on machine 102-2. If machine 102-2 is really down, then there is no problem at all. But if the machine 102-2 is alive (and therefore the applications 106-2 on machine 102-2 are still running), embodiments need to ensure that after machine 102-1 detects the failure, these applications can really be considered as dead. The actual meaning of being "dead" varies from application to application. Of course, if the application process is not running at all, it is considered to be "dead." However, it is also possible that the process is still running but from the rest of the system it effectively does not exist.

There are several approaches to achieve the above: (1) notify the process that it should be go down; (2) kill the process using an operating system primitive; (3) every time the process performs an action visible to the external system, it consults the lease agent 108 to check whether it is allowed to do so; or (4) similar to 3, except that the lease agent 108 gives a local lease to the application instance 106 so that the application instance 106 does not have to check the lease agent 108 each time.

The first and the second approach are relatively simple. However, they do not guarantee how long they will take and therefore are not suitable in a system that requires complete consistency. Having the application poll the lease agent 108 can ensure consistency. When such polling access is cheap, approach 3 is a viable option. But if the lease agent 108 is not in the same process as the application instance 106, such access can become expensive and the $4^{th}$ approach may be a better choice.

In embodiments that are not configured to provide faster failure detection before the machines lease is expired, it is safe for the lease agent 108 to give the local lease up to the minimum of its lease expiration time among all the lease relationships (more accurately, the relationships where the machines 102 is a subject). However, it is possible that the application instance is not able to renew its lease in time (e.g. when the application instance is stuck during garbage collection) and embodiments do not want to kill such instances. This means that when the local lease expires, the lease agent 108 should not consider the application instance 106 as being dead, instead, it is only that the application instance 106 needs to respect the TTL and not perform any visible actions. In fact, if an application instance 106 finds that its local lease is expired, it should immediately try to renew it with the lease agent 108 and if that is successful it can continue to function in the normal way.

As the lease agent 108 cannot declare the application instance 106 to be dead after the application instance's local lease is expired, embodiments still have a problem to deal with for application instance 106 that is really stuck (either permanently or for a period that is too long to be acceptable). Embodiments can have another type of local lease with a long TTL. This can be different for each application instance 106). When this long TTL is expired, the lease agent 108 can consider the application instance 106 to be dead. The application instance 106 can either have a timer to kill itself when this longer TTL is expired, or checks for this expiration only when renewing its TTL. Note that the consistency guarantee comes from the previous lease instead of this one. In fact, theoretically embodiments do not need this TTL because as described earlier, there is not a generic way to deal with application instance 106 that is "stuck" as it is also possible that the application instance 106 is not functioning but still manages to renew its local lease. Embodiments can consider this longer TTL as a common watchdog for the applications but ultimately it is the application instance's job to detect such issues. Since the implementation of such a TTL is typically quite simple, it is a useful alternative so that simple applications do not have to provide their own watchdog.

The following now illustrates details with respect to states and interactions. State is maintained in the lease agent 108 for each remote machine. For example, machine 102-1 will maintain state information in its lease agent 108-1 for the machine 102-2. As it is possible that embodiments run multiple lease services on a single machine, more accurately speaking, such state is for each remote lease agent 108 instance. Thus, machine 102-1 will maintain information in its lease agent 108-1 for the lease agent 108-2. If the machine 102-2 included another lease agent, the lease agent 108-1 could maintain state for that lease agent as well.

The lease agent 108 maintains a list of the local applications that have registered with the lease agent 108. For example, lease agent 108-1 maintains a list of application instances 106-1. When the application instance 106 deregisters itself, or when the lease agent 108 detects the application instance 106 has crashed, the list should be updated to remove such application instance 106.

The lease agent 108 maintains states for each pair of a lease relationship. In particular, in the example, shown, the lease agent maintains state for each remote lease agent 108 instance that it has a relationship with.

As the establishment and termination of such relationships depends on the application layer 104 monitoring relationships, additional state is also maintained. The following is a list of states that may be maintained for each relationship in the illustrated examples:

Subject list 130. This is a collection of application level monitoring relationships where the applications on the local machine 102-1 act as a subject. Each relationship contains both the local application identifier and the remote application identifier.

Pending list 132. This is an optimization to avoiding sending the subject list to the remote side repeatedly. It contains the subject relationships that need to be established or terminated but that are not yet acknowledged by the remote side. Note that a pending establishment and a pending termination of the same relationship do not cancel each other.

Monitor list 134. The monitor list 134 is similar to the pending list 132, but applications on the local machine 102-1 act as a monitor. In particular, the monitor list is an optimization to avoiding sending the subject list to the second machine repeatedly, wherein the monitor list contains the monitor relationships that need to be established or terminated but that are not yet acknowledged by the second machine.

Failure list 136. This is a collection of local failed applications that appear in either the subject list 130, pending list 132 (removal only) or the monitor list 134. This is an optional optimization that may be included optionally in some embodiments, as embodiments can calculate the collection explicitly.

Note that in this model the application layer 104 establishes the lease relationship from the subject only. The alternative where the monitor initiates the relationship is also possible.

Since leases are initiated by the subject (or alternatively the monitor), the local side is only the authority for the subject list 130 but not the monitor list 134. In other words, it can only update the monitor list 134 in response to a request from the remote side. In general, embodiments have the following guidelines for updating these lists:

Subject list 130: For the subject list 130, embodiments update the subject list 130 when an application instance 106 requests to establish/terminate a subject relationship. Additionally, when embodiments detect that either the local or the remote application instance 106 is down, embodiments can also remove entries from this subject list 130.

Pending list 132: For the pending list 132, whenever the subject list 130 changes, the change will be added to the pending list 132. When a change is acknowledged by the remote side, it can be removed from the pending list 132. Note that this could alternatively be achieved by maintaining version number on the subject list 132.

Monitor list 134: For the monitor list 134, embodiments update the monitor list 134 when the remote lease agent 108 requests to establish/terminate a monitor relationship (from the perspective of the local side).

Failure list 136: For the failure list 136, embodiments recalculate the failure list whenever the subject list, pending subject list or monitor list changes or when an application instance 106 is removed from the local application instance list.

Local Interactions

Embodiments may have the following interactions between the local application instances 106 and the lease agent 108:

When an application instance 106 starts, it registers with the lease agent 108 before it communicates its existence to other application instances. Both the instance identifier and a notification mechanism are passed to the lease agent 108 in the registration. The latter is for the lease agent 108 to notify the application instance 106 when a remote application instance is down. The lease agent 108 adds the application instance 106 into its local application list.

The local application instance 106 can request the lease agent 108 to initiate a subject relationship with a remote application instance. The lease agent 108 will find the lease relationship for the remote lease agent 108 (and create one if it does not exist). The relationship will be added to both the subject list 130 and the pending list 132. If this is the first subject relationship, a subject lease relationship with the remote side will be established.

The local application instance can request the lease agent 108 to terminate the subject relationship it previously established. The relationship will be removed from the subject relationship collection and a pending termination will be added to the pending list.

The local application instance 106 is terminated. Note that this can also be triggered by a crash of the local application instance 106 by some local detection mechanism (e.g. embodiments may wait on the process handle of the local application instance). The application instance 106 will be added to the failure list 136 if it is either in the subject list 130 or monitor list 134. Further, if the application instance 106 is in subject list 130, every relationship having it as subject will be removed from the subject list 130. Note that such a change will trigger a corresponding update for the pending list 132.

When the lease agent 108 detects that a remote application instance is down, it will inform the local application instances that are interested in this remote instance. Note that this is an activity initiated from the lease agent 108. This should happen along with the removal of the monitor relationships (from the local machine perspective) initiated by the remote side, if the remote application instance 106 is a subject.

Interactions Between Lease Agents

The lease agents 108 exchanges messages with each other when a monitor relationship exists in either direction (or both). A lease message can contain information such as one or more of the following:

A lease request. Typically the request is to renew a lease. However a termination request is also possible.

A lease grant. Where embodiments give the subject complete control of the lease relationship, a reply is always a lease grant.

The subject relationships that is to be established or terminated. In some embodiments, this is basically the content of the pending list 132.

The acknowledgement of previously requested establishment and termination.

The identifiers of the local failed applications that the remote side is interested in. In some embodiments, this is basically the content of the failure list.

Also note that when the machines 102 should send messages and what information is included in the message can be flexible. Some embodiments always send a reply once a request is received. However, there can be optimizations to delay a reply such that it can be merged with a later request, if embodiments manage the timing carefully.

The following rules should apply to messaging:

Whenever a local application instance is down, a message should be sent immediately.

Whenever a subject relationship is to be established, a message should also be sent immediately.

When a subject relationship is to be terminated, if it does not result in the termination of the lease relationship between the lease agent 108 instances, the message can be delayed.

Each message can always contain a lease grant for the last received lease request. This may be useful to grant the lease earlier and may be done with a small overhead in the message size.

Processing of a Lease Message

Whenever an establish/terminate request is received, the monitor list 134 is updated.

An acknowledgement of a lease message includes the establish/terminate requests of the previously received lease message.

When an acknowledgement is received, the pending list 132 is updated.

When failure notification is received, embodiments notify the related local applications. In addition, if the failed remote application instance 106 is a monitor, the corresponding subject relationship is removed. If the remote application instance 106 is a subject, the remote side indicates the removal of the relationship in the same message and no special processing is required.

Arbitration of Machine Failures or Lease Timeouts

Due to various different types of communication errors and machine malfunctions, there exists some possibility that each machine in a pair of machines will suspect failure of the other machine. Further, each machine may suspect that it is functioning properly.

When a machine 102 in a pair of machines suspects the other machine of failure, arbitration mechanisms can be used to determine at least which machine has or should fail.

For example, when each machine in a pair of machines suspects the other machine of failing, each machine can transition to a timeout state and report their suspicion to an arbitration facility. When in a timeout state, certain other processing at each machine can be suspended until the results of the arbitration are received. The arbitration facility can report back to a machine indicating if it is to remain active. For example, an arbitration facility can send an accept message to a reporting machine that is to remain active. The arbitration facility can send a deny message to a reporting machine that is to transition to a failure state. A machine that receives an accept message can remain active. A machine that doesn't not receive an accept message (e.g., due to network conditions) or that receives a deny message transitions to a failure state.

Figure 2:
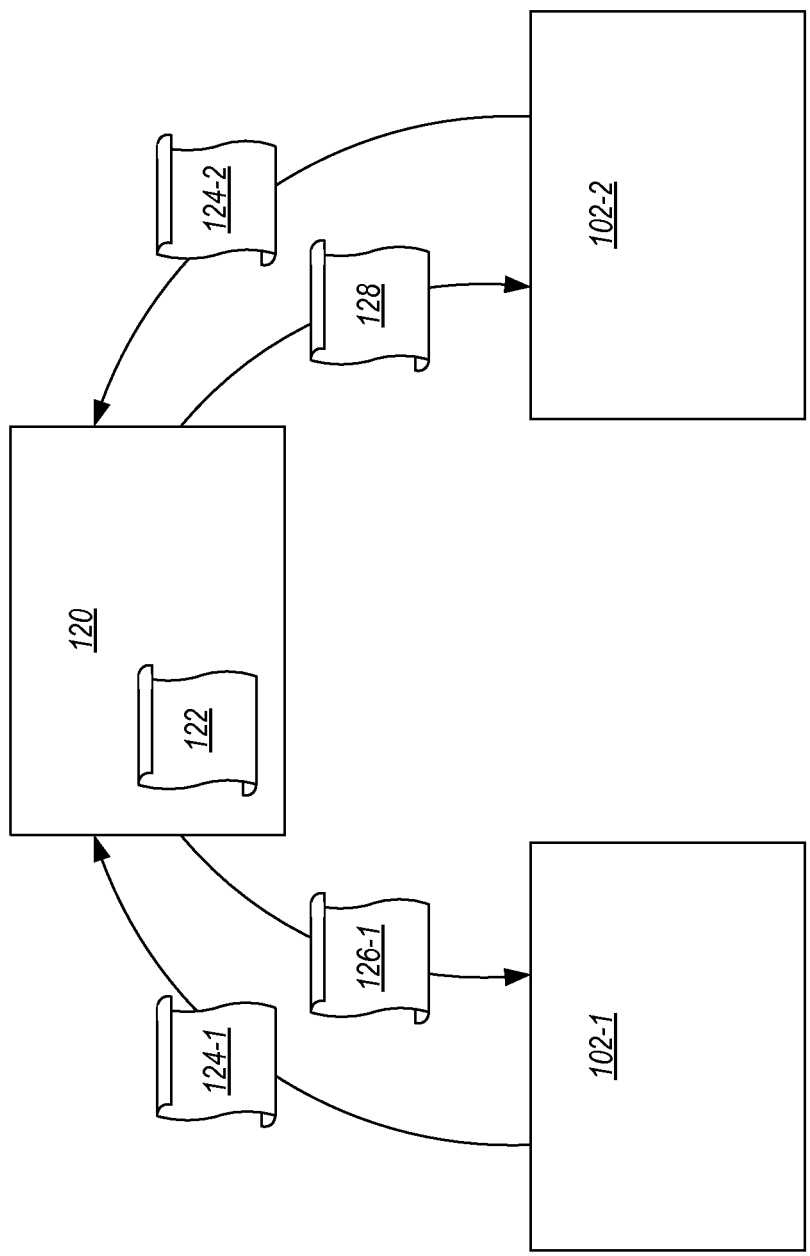
FIG. 2 illustrates arbitration between two machines.

FIG. 2 illustrates an example of arbitration when mutually monitoring machines each can report that the other machine is suspected of failing. Figure illustrates machine 102-1 and machine 102-2. FIG. 2 also illustrates an arbitrator 120.

In some embodiments, arbitrator 120 is mutually agreed to by machine 102-1 and machine 102-2 to arbitrate for machines 102-1 and 102-2. In other embodiments, arbitrator 120 is assigned to arbitrate for machines 102-1 and 102-2 by another entity. The other entity can be another machine internal to a network or, for example, a human administrator.

Arbitrator 120 can have varying knowledge of a network including the machines 102. For example, arbitrator 120 can have global knowledge of the network. Alternately, arbitrator 120 can have knowledge of some subset of the network.

Arbitrator 120 can be configured to arbitrate for any number of machine pairs including, but not limited to, machines 102-1 and 102-2. In some embodiments, an arbitration mechanism has no knowledge of machines it is to arbitrate for prior to receiving a report of a suspected machine failure. Thus, although a pair of machines have agreed to use arbitrator 120 or arbitrator 120 has been assigned to arbitrate for a pair of machines, arbitrator 120 may be unaware of any agreement or assignment prior to receiving a report of a suspected machine failure for a machine in the pair of machines.

Arbitration can include arbitrating between machines that present conflicting failure reports. For example, when a first machine 102-1 is monitoring a second machine 102-2 and the second machine 102-2 is also monitoring the first machine 102-1, it may be that each machine reports that the other machine is suspected of failure. The suspected failure can be detected using virtually any failure detection mechanisms including those previously described in this document.

The arbitrator 120 may maintain a failed machine list 122 can include a list of machines that have been reported as suspected failed machines. Machines can be report other machines as suspected failed machines to arbitrator 120 and, when appropriate, arbitrator 120 can include the reported machines in failed machine list 122. Arbitrator 120 can remove failed machines from failed machine list 122 after appropriate periods of time (e.g., at a future time when the likelihood of continued conflict is not possible). For example, entries in failed machine list 122 can be removed at a recovery time interval after they were inserted into failed machine list 122. The recovery time interval can be long enough to insure that machines that have been told to fail do fail.

Thus, embodiments of the invention include arbitrating between conflicting reports of suspected machine failures. Arbitrating between conflicting reports of suspected machine failures can include an act of a first machine sending a report to an arbitration facility that a second machine is suspected of failing. For example, machine 102-1 can send report 124-1 to arbitrator 120. Arbitrating between conflicting reports of suspected machine failures can include an act of an arbitrator receiving a report from the first machine that the second machine is suspected of failing. For example, arbitrator 120 can receive report 124-1 from machine 102-1.

Arbitrating between conflicting reports of suspected machine failures can include an act of the arbitrator determining that no other machine has suspected the first machine of failing within a specified recovery time interval prior to receiving the report from the first machine. For example, arbitrator 120 can determine that no other machine has suspected machine 102-1 of failing within a given recovery time interval (after which arbitrator 120 would have removed machine 102-1 from failed machine list 122 anyway).

Arbitrating between conflicting reports of suspected machine failures can include an act of the arbitrator recording in a list that the second machine is in a failure state. For example, arbitrator 120 can record in failed machine list 122 that machine 102-2 is in a failure state.

Arbitrating between conflicting reports of suspected machine failures can include an act of the arbitrator sending an accept message to the first machine within a maximum response time interval, the accept message including a failure time value indicative of a time period after which the second machine is guaranteed to transition into a failure state. For example, arbitrator 120 can send accept message 126-1 to machine 102-1 within the maximum response time interval of receiving report 124-1. Accept message 126-1 includes a failure time interval indicative of a time when machine 102-2 is guaranteed to have transitioned into a failure state. Generally, a maximum response time interval represents a point in time after which a requestor (e.g., machine 102-1 or 102-2) assumes an arbitration facility (arbitrator 120) will not answer a request for arbitration (e.g., report 124-1). When a maximum response time interval expires at a requestor subsequent to sending a request for arbitration, the requestor performs similar (and potentially identical) operations to those that would be performed if an express deny message was received.

Arbitrating between conflicting reports of suspected machine failures can include an act of the first machine receiving an accept message from the arbitration facility within a maximum response time interval, the accept message including a time value indicative of a time period after which the second machine is guaranteed to transition into a failure state. For example, machine 102-1 can receive accept message 126-1, including a failure time interval, from arbitrator 120. The failure time interval is indicative of a time when machine 102-2 is guaranteed to have transitioned into a failure state.

At some time at or after the first machine reports the second machine, the second machine may also suspect the first machine of failure. For example, it may be that machine 102-2 also suspects machine 102-1 of failure.

Arbitrating between conflicting reports of suspected machine failures can include an act of the second machine sending a report to the arbitration facility that the first machine is suspected of failing. For example, machine 102-2 can send a report 124-2 to arbitrator 120 that machine 102-1 is suspected of failure. Arbitrating between conflicting reports of suspected machine failures can include an act the arbitrator receiving a report from the second machine that the first machine is suspected of failing, the report from the second machine received within the specified recovery time interval subsequent to receiving the report from the first machine. For example, arbitrator 120 can receive report 124-2 from machine 102-2 that machine 102-1 is suspected of failure within the recovery time interval of receiving report 124-1.

Arbitrating between conflicting reports of suspected machine failures can include an act of the arbitrator referring to the list to determine that the second machine is to transition to a failure state. For example, arbitrator 120 can refer to failed machine list 122 to determine that machine 102-2 is to transition to a failure state.

Arbitrating between conflicting reports of suspected machine failures can include an act of sending a deny message to the second machine to cause the second machine to transition into a failure state. For example, arbitrator 120 can send deny message 128 to machine 102-2 to cause machine 102-2 to transition to a failure state. Arbitrating between conflicting reports of suspected machine failures can include an act of the second machine receiving a deny message from the arbitration facility. For example, machine 102-2 can receive deny message 128 from arbitrator 120.

Arbitrating between conflicting reports of suspected machine failures can include an act of the second machine transitioning into a failure state. For example, machine 102-2 can transition into a failure state in response to receiving deny message 128.

Lease Expiration

When a machine lease expires, the lease agent 108 will first try to do arbitration as outlined above. In the current lease agent 108, the arbitration timeout is added to the lease interval so that when a machine's lease expires, it is still allowed to function until the arbitration times out, or until it fails in arbitration (if it wins arbitration of course it can continue to live). This adds the failure detection time since embodiments include an extra arbitration timeout (which cannot be too small to allow for arbitration retry). Now it is possible to declare application instances effectively down, once the lease expires, as long as the lease agent 108 stops issuing local leases during the arbitration phase. However, this also has a drawback in that now the machines winning arbitration will have to stop functioning during the arbitration phase, although typically this is a short interval.

When a subject fails its lease (e.g. when a lease has expired and arbitration also failed), the lease agent 108 should stop renewing local leases to the local application instances already registered. Embodiments can alternatively or additionally kill the application instances, or notify them that they need to go down. It can also notify other machines 102 about its failure (in a best effort manner). Note that the lease agent 108 itself does not have to be killed. Rather, the lease agent can simply increase its instance id and clear its old state.

On the monitor side, application instances 106 running on the remote machines 102 that have lost lease can be considered as dead. The lease agent 108 can notify local application instances that are interested in the remote machine.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
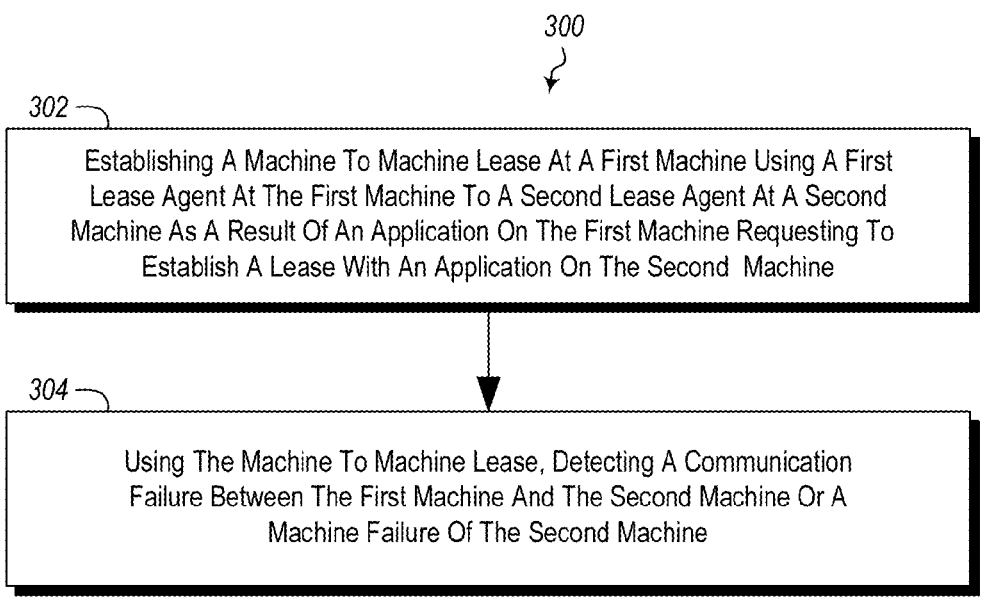
FIG. 3 illustrates method of detecting failures of interconnected machines.

Referring now to FIG. 3, a method 300 is illustrated. The method 300 includes acts for detecting failures of interconnected machines. The method includes establishing a machine to machine lease at a first machine using a first lease agent at the first machine to a second lease agent at a second machines as a result of an application on the first machine requesting to establish a lease with an application on the second machine (act 302). For example, as illustrated in FIG. 1, an application instance 106-1-1 on machine 102-1 may request a lease on an application instance 106-2-1 at the second machine 102-2. This results in the lease agent 108-1 establishing a lease with the lease agent 108-2.

The method 300 further includes using the machine to machine lease, detecting a communication failure between the first machine and the second machine or a machine failure of the second machine (act 304). For example, as described above, communication or machine failures can be detected, for example, by leases not being renewed, responses not being received or "heartbeat" messages not being received.

The method 300 may further include, as a result of detecting a communication failure between the first machine and the second machine or a machine failure of the second machine, submitting to arbitration to have an arbitrator decide if applications at the first machine or the second machine should go down. For example, FIG. 2 illustrates an example of arbitration.

The method 300 may further include registering a single application instance on the first machine to a plurality of different lease agents on the first machine such than any of the lease agents in the plurality of lease agents can indicate to the application instance that the application instance should go down. For example, in FIG. 1, an application instance 106-1-1 may register not only with the lease agent 108-1, but may also register with other lease agents on the first machine 102-1. In some such embodiments, each of the lease agents in the plurality of lease agents is configured to detect different types of application or machine failures. In some embodiments, the single application instance on the first machine going down is visible to all of the lease agents in the plurality of different lease agents on the first machine such that the lease agents on the first machine can indicate that the application is down on lease agents on other machines.

The method 300 may be practiced where the first machine stores a subject list. As illustrated above, the subject list includes a collection of application level monitoring relationships where the applications on the first machine act as a subject. Each relationship identifies both a local application instance on the first machine and a remote application instance on the second machine.

The first machine may store a pending list as an optimization to avoiding sending the subject list to the second machine repeatedly. The pending list contains the subject relationships that need to be established or terminated but that are not yet acknowledged by the second machine.

The first machine may store a monitor list as an optimization to avoiding sending the subject list to the second machine repeatedly. The monitor list contains the monitor relationships that need to be established or terminated but that are not yet acknowledged by the second machine.

The first machine may store a failure list. The failure list includes a collection of local failed application instances that appear in either the subject list, the pending list, or the monitor list.

Figure 4:
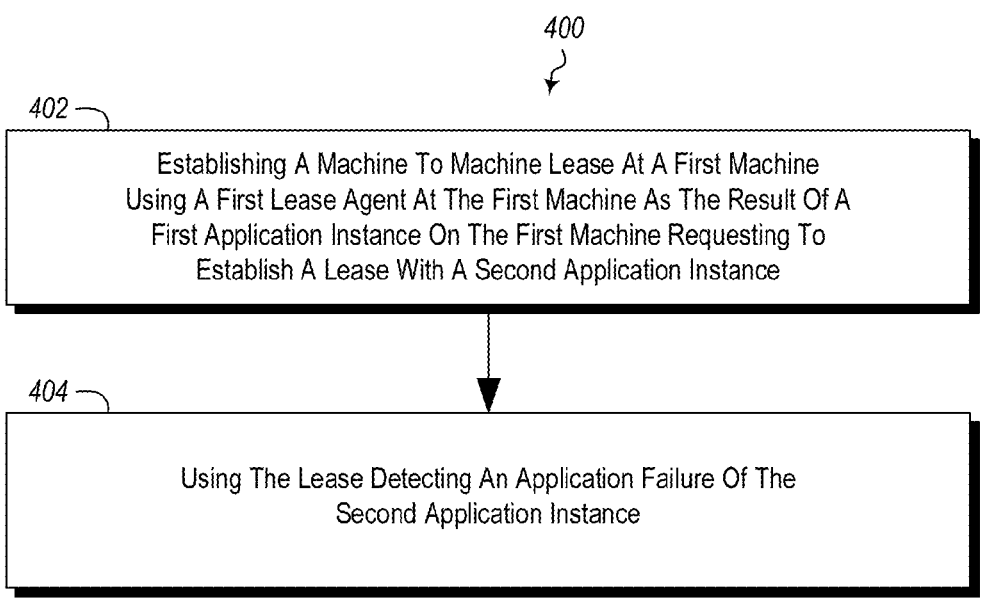
FIG. 4 illustrates another method of detecting failures of interconnected machines.

Referring now to FIG. 4, a method 400 is illustrated. The method 400 includes acts for detecting failures of interconnected machines. The method includes establishing a machine to machine lease at a first machine using a first lease agent at the first machine as the result of a first application instance on the first machine requesting to establish a lease with a second application instance (act 402).

The method 400 further includes using the lease detecting an application failure of the second application instance (act 404).

The method 400 may be practiced where the machine to machine lease is a lease between the first machine and itself using the same first lease agent. In this case, the first application instance and the second application instance both register with the first lease agent. For example, in FIG. 1, two application instances 106-1-1 and 106-1-n may both register with the lease agent 108-1.

The method 400 may be practiced where the machine to machine lease is a lease between the first machine and itself using two different lease agents on the first machine. In this case, the first application instance registers with the first lease agent on the first machine and the second application instance registers with a second lease agent on the first machine. The first and second lease agents communicate with each other. For example, the application 106-1-1 may register with the lease agent 108-1 while the application instance 106-1-n registers with a different lease agent (not shown) on the first machine 102-1. The two lease agents could then communicate as described previously herein.

The method 400 may be practiced where the machine to machine lease is a lease between the first machine and a second machine using the first lease agent on the first machine and a second lease agent on the second machine. In this example, the first application instance registers with the first lease agent on the first machine and the second application instance registers with a second lease agent on the second machine. The first and second lease agents communicate with each other. For example, the application instance 106-1-1 registers with the lease agent 108-1 on the machine 102-1 and the application instance 106-2-1 registers with the lease agent 108-2 on the machine 102-2. The lease agents 108-1 and 108-2 could communicate with each other as described above.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of detecting failures of interconnected machines, the method comprising:
    establishing a machine to machine lease at a first machine using a first lease agent at the first machine to a second lease agent at a second machine as a result of an application on the first machine requesting to establish a lease with an application on the second machine;
    registering a single application instance on the first machine to a plurality of different lease agents on the first machine such that any of the lease agents in the plurality of lease agents can indicate to the application instance that the application instance should go down; and
    using the machine to machine lease, detecting a communication failure between the first machine and the second machine or a machine failure of the second machine.

2. The method of claim 1, further comprising as a result of detecting a communication failure between the first machine and the second machine or a machine failure of the second machine, submitting to arbitration to have an arbitrator decide if applications at the first machine or the second machine should go down.

3. The method of claim 1, wherein each of the lease agents in the plurality of lease agents is configured to detect different types of application or machine failures.

4. The method of claim 1, wherein the single application instance on the first machine going down is visible to all of the lease agents in the plurality of different lease agents on the first machine such that the lease agents on the first machine can indicate that the application is down on lease agents on other machines.

5. The method of claim 1, wherein the first machine stores a subject list, wherein the subject list comprises a collection of application level monitoring relationships where the applications on the first machine act as a subject, wherein each relationship identifies both a local application instance on the first machine and a remote application instance on the second machine.

6. The method of claim 5, wherein the first machine stores a pending list as an optimization to avoiding sending the subject list to the second machine repeatedly, wherein the pending list contains the subject relationships that need to be established or terminated but that are not yet acknowledged by the second machine.

7. The method of claim 6, wherein the first machine stores a monitor list as an optimization to avoiding sending the subject list to the second machine repeatedly, wherein the monitor list contains the monitor relationships that need to be established or terminated but that are not yet acknowledged by the second machine.

8. The method of claim 7, wherein the first machine stores a failure list, the failure list comprising a collection of local failed application instances that appear in either the subject list, the pending list, or the monitor list.

9. A method of detecting failures of interconnected machines, the method comprising:
   establishing a machine to machine lease at a first machine using a first lease agent at the first machine as the result of a first application instance on the first machine requesting to establish a lease with a second application instance, wherein the machine to machine lease is a lease between the first machine and itself using at least one of:
      the same first lease agent, wherein the first application instance and the second application instance both register with the first lease agent, or
      using two different lease agents on the first machine where the first application instance registers with the first lease agent on the first machine and the second application instance registers with a second lease agent on the first machine, and wherein the first and second lease agents communicate with each other; and
   using the lease detecting an application failure of the second application instance.

10. The method of claim 9, wherein the machine to machine lease is performed using the same first lease agent, wherein the first application instance and the second application instance both register with the first lease agent.

11. The method of claim 9, wherein the machine to machine lease is performed using the two different lease agents on the first machine where the first application instance registers with the first lease agent on the first machine and the second application instance registers with the second lease agent on the first machine, and wherein the first and second lease agents communicate with each other.

12. A system for detecting failures of interconnected machines, the system comprising:
   one or more processors; and
   one or more computer readable media, wherein the one or more computer readable media comprise computer executable instructions that when executed by at least one of the processors cause the system to perform the following:
      establishing a machine to machine lease at a first machine using a first lease agent at the first machine to a second lease agent at a second machines as a result of an application on the first machine requesting to establish a lease with an application on the second machine;
      wherein the first machine stores a subject list, wherein the subject list comprises a collection of application level monitoring relationships where the applications on the first machine act as a subject, wherein each relationship identifies both a local application instance on the first machine and a remote application instance on the second machine; and
      using the machine to machine lease, detecting a communication failure between the first machine and the second machine or a machine failure of the second machine.

13. The system of claim 12, wherein the computer readable media further comprise computer executable instructions that when executed by at least one of the processors cause the system to: as a result of detecting a communication failure between the first machine and the second machine or a machine failure of the second machine, submit to arbitration to have an arbitrator decide if applications at the first machine or the second machine should go down.

14. The system of claim 12, wherein the computer readable media further comprise computer executable instructions that when executed by at least one of the processors cause the system to register a single application instance on the first machine to a plurality of different lease agents on the first machine such that any of the lease agents in the plurality of lease agents can indicate to the application instance that the application instance should go down.

15. The system of claim 12, wherein the first machine stores a pending list as an optimization to avoiding sending the subject list to the second machine repeatedly, wherein the subject list contains the subject relationships that need to be established or terminated but that are not yet acknowledged by the second machine.

16. The system of claim 12, wherein the first machine stores a monitor list as an optimization to avoiding sending the subject list to the second machine repeatedly, wherein the monitor list contains the monitor relationships that need to be established or terminated but that are not yet acknowledged by the second machine.

17. The system of claim 12, wherein the first machine stores a failure list, the failure list comprising a collection of local failed application instances that appear in either the subject list, the pending list, or the monitor list.

18. A system for detecting failures of interconnected machines, the system comprising:
   one or more processors; and
   one or more computer readable media, wherein the one or more computer readable media comprise computer executable instructions that when executed by at least one of the processors cause the system to perform the following:
      establishing a machine to machine lease at a first machine using a first lease agent at the first machine to a second lease agent at a second machines as a result of an application on the first machine requesting to establish a lease with an application on the second machine;

using the machine to machine lease, detecting a communication failure between the first machine and the second machine or a machine failure of the second machine;

submitting an arbitration request to an arbitrator upon detecting the communication failure or machine failure, the arbitration request causing the arbitrator to generate at least one of an accept message and a deny message in response to the arbitration request and based at least in part on a failed list maintained at the arbitrator, and receiving, at the first machine, at least one of:
the accept message from the arbitrator, the accept message including a time value indicative of a time period associated with the second machine transitioning into a failure state; or
the deny message from the arbitrator, wherein receipt of the deny message causes the first machine to transition into a failure state.

19. The system of claim 18, wherein the first machine receives the accept message.

20. The system of claim 18, wherein the first machine receives the deny message and transitions into the failure state.

* * * * *